United States Patent
Motoya et al.

(10) Patent No.: US 10,514,561 B2
(45) Date of Patent: Dec. 24, 2019

(54) OPTICAL MODULATOR

(71) Applicant: SUMITOMO OSAKA CEMENT CO., LTD., Tokyo (JP)

(72) Inventors: Masayuki Motoya, Tokyo (JP); Toshio Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/360,030

(22) Filed: Mar. 21, 2019

(65) Prior Publication Data

US 2019/0302489 A1  Oct. 3, 2019

(30) Foreign Application Priority Data

Mar. 30, 2018  (JP) ................................. 2018-067836

(51) Int. Cl.
  *G02F 1/035* (2006.01)
  *G02F 1/03* (2006.01)
  *G02F 1/225* (2006.01)

(52) U.S. Cl.
  CPC ............ *G02F 1/035* (2013.01); *G02F 1/0316* (2013.01); *G02F 1/0327* (2013.01); *G02F 1/2255* (2013.01)

(58) Field of Classification Search
  None
  See application file for complete search history.

(56) References Cited

U.S. PATENT DOCUMENTS

| 6,192,167 | B1 * | 2/2001 | Kissa | G02F 1/0356 385/14 |
| 7,751,656 | B2 * | 7/2010 | Sugiyama | G02F 1/2255 359/251 |
| 9,075,254 | B2 * | 7/2015 | Takemura | G02F 1/0316 |
| 10,025,121 | B2 | 7/2018 | Katou et al. | |
| 10,126,573 | B2 * | 11/2018 | Miyazaki | G02F 1/035 |
| 2017/0139240 | A1 * | 5/2017 | Katou | G02F 1/0356 |
| 2019/0302489 | A1 * | 10/2019 | Motoya | G02F 1/2255 |

FOREIGN PATENT DOCUMENTS

JP  2015191137  11/2015

* cited by examiner

*Primary Examiner* — Rhonda S Peace
*Assistant Examiner* — R. Peace
(74) *Attorney, Agent, or Firm* — JCIPRNET

(57) ABSTRACT

An optical modulator includes a substrate, an optical waveguide, a control electrode applying a high frequency signal in order to modulate light waves propagating through the optical waveguide, and a relay substrate provided with a relay line to transfer the high frequency signal to the control electrode. The control electrode and the relay line together have a coplanar line structure inclusive of at least electrical connection portions of both the control electrode and the relay line. The control electrode includes an electrical connection portion and a routing portion positioned between the electrical connection portion and an active portion applying an electrical field to the optical waveguide. The routing portion has a coplanar line structure. A distance between ground electrodes sandwiching a signal electrode in the electrical connection portion of the control electrode is substantially equal to a distance between ground electrodes sandwiching a signal electrode of the routing portion.

16 Claims, 2 Drawing Sheets

OPTICAL MODULATOR

CROSS-REFERENCE TO RELATED APPLICATION

This application claims the priority of Japan patent application serial no. 2018-067836, filed on Mar. 30, 2018. The entirety of the above-mentioned patent application is hereby incorporated by reference herein and made a part of this specification.

BACKGROUND

Technical Field

The present disclosure relates to an optical modulator, and more particularly, to an optical modulator that includes a substrate having an electro-optical effect, an optical waveguide formed on the substrate, a control electrode formed on the substrate and applying a high frequency signal in order to modulate light waves propagating through the optical waveguide, and a relay substrate provided with a relay line in order to transfer the high frequency signal to the control electrode.

Description of Related Art

In optical communication fields and optical measurement fields, optical modulators in which an optical waveguide and a control electrode are incorporated in a substrate having an electro-optical effect such as a lithium niobate substrate (LN substrate) have been widely used. Relay substrates and terminus substrates have been used when high frequency signals are input to control electrodes of these optical modulators or are output from terminuses of the control electrodes. Although the description of the present disclosure is given focusing on a relay substrate, completely the same configuration can be adopted even for a terminus substrate, and thus a "relay substrate" in the present disclosure is used in a sense of also including a terminus substrate.

A control electrode of an optical modulator and a relay line formed on a relay substrate have a coplanar line structure in order to transmit a high frequency signal. In addition, wire bonding between a signal electrode constituting a control electrode and a signal line of a relay line and wire bonding between a ground electrode constituting the control electrode and a ground line of the relay line are performed using a gold wire, a gold ribbon, or the like.

Since a material such as alumina is usually used for a relay substrate, a substrate (an LN substrate or the like) constituting an optical modulator has a varying dielectric constant. For this reason, in electrical connection between a control electrode and a relay line, characteristic impedances of both the control electrode and the relay line are generally adjusted to coincide with each other.

As also disclosed in Japanese Patent Application Laid-Open No. 2015-191137, in order to perform electrical connection between a control electrode and a relay line, it is essential to form a pad portion in a signal electrode and a signal line in order to secure a region to be subjected to wire bonding. For this reason, the pad portion of the signal electrode becomes wider than the widths of the other signal electrodes, and accordingly, a distance between ground electrodes disposed to sandwich the signal electrode also becomes wider. In addition, a distance between the ground electrodes is set to vary depending on a change in the width of the signal electrode.

Such a change in the shape of the electrode due to the pad portion particularly enlarges a current path of the ground electrode, which results in an increase in a propagation loss of a high frequency signal due to radiation. For this reason, Japanese Patent Application Laid-Open No. 2015-191137 proposes a method of adjusting the position of wire bonding for connecting the control electrode and the relay line and a method of adjusting the shape of an edge on the signal electrode side of the ground electrode.

However, in these configurations, it is difficult to sufficiently reduce a propagation loss, and particularly, it is essential to further reduce a propagation loss of a high frequency signal in providing a broadband optical modulator capable of achieving greater than 30 GHz and even reaching 100 GHz.

SUMMARY

The disclosure provides an optical modulator capable of reducing a propagation loss of a high frequency signal in electrical connection between a control electrode of the optical modulator and a relay line of a relay substrate.

According to an embodiment, an optical modulator has the following technical features.

(1) An optical modulator including a substrate having an electro-optical effect, an optical waveguide formed on the substrate, a control electrode formed on the substrate and applying a high frequency signal in order to modulate light waves propagating through the optical waveguide, and a relay substrate provided with a relay line in order to transfer the high frequency signal to the control electrode is provided. The control electrode and the relay line together have a coplanar line structure inclusive of at least electrical connection portions of both the control electrode and the relay line. The control electrode includes an electrical connection portion of the control electrode, and a routing portion positioned between the electrical connection portion of the control electrode and an active portion applying an electrical field to the optical waveguide. The routing portion has a coplanar line structure. A distance G2 between ground electrodes sandwiching a signal electrode in the electrical connection portion of the control electrode is substantially equal to a distance G1 between ground electrodes sandwiching a signal electrode of the routing portion.

(2) In the optical modulator according to (1), a distance G3 between ground lines sandwiching a signal line in the electrical connection portion of the relay line is substantially equal to the distance G2 between the ground electrodes sandwiching the signal electrode in the electrical connection portion of the control electrode.

(3) In the optical modulator according to (1) or (2), the signal electrode in the electrical connection portion of the control electrode is electrically connected from the relay line and includes a pad portion having the largest width and a tapered portion which continues from the pad portion to the routing portion, and a length L of the pad portion is set to a tenth or less of a wavelength of the high frequency signal.

(4) In the optical modulator according to any one of (1) to (3), the signal electrode in the electrical connection portion of the control electrode is electrically connected from the relay line and includes a pad portion having a largest width and a tapered portion which continues from the pad portion to the routing portion, and a width S2 of the pad portion is set to a tenth or less of the wavelength of the high frequency signal.

(5) In the optical modulator according to any one of (1) to (4), a material of the substrate having an electro-optical effect is lithium niobate or a polymer-based material.

DESCRIPTION OF THE EMBODIMENTS

Figure 1:
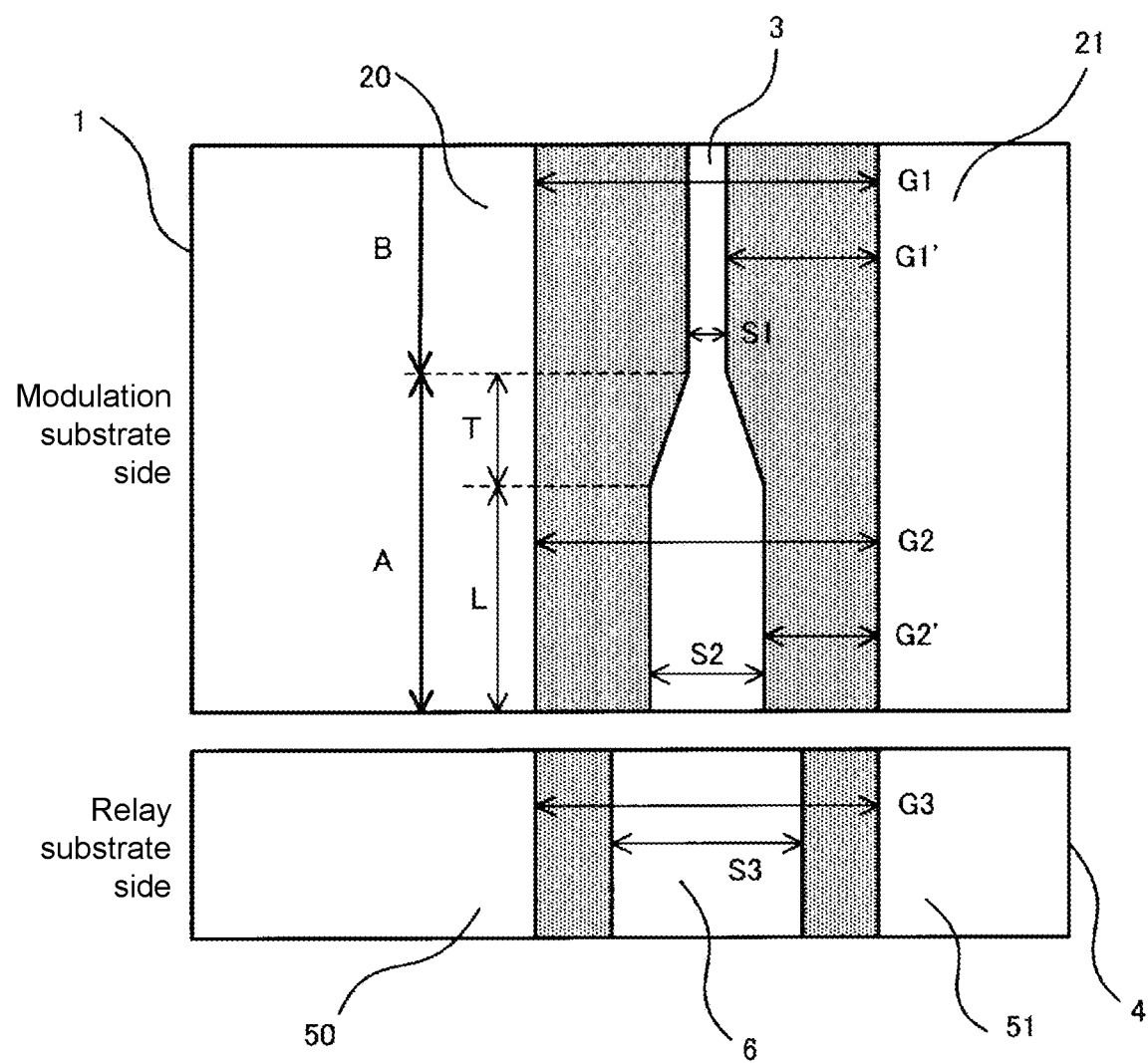
FIG. 1 is a diagram illustrating a first example according to an optical modulator of the present disclosure.

Hereinafter, an optical modulator of the present disclosure will be described in detail using examples. As illustrated in FIG. 1, the optical modulator of the present disclosure is an optical modulator that includes a substrate 1 having an electro-optical effect, an optical waveguide (not shown) formed on the substrate, a control electrode formed on the substrate and applying a high frequency signal in order to modulate light waves propagating through the optical waveguide, and a relay substrate 4 provided with a relay line in order to transfer the high frequency signal to the control electrode. The control electrode and the relay line together have a coplanar line structure inclusive of at least electrical connection portions of both the control electrode and the relay line, the control electrode includes an electrical connection portion (A) of the control electrode and a routing portion (B) positioned between the electrical connection portion of the control electrode and an active portion applying an electrical field to the optical waveguide. The routing portion has a coplanar line structure. A distance G2 between ground electrodes sandwiching a signal electrode in the electrical connection portion of the control electrode is substantially equal to a distance G1 between ground electrodes sandwiching a signal electrode of the routing portion.

In FIG. 1, the control electrode has a coplanar line structure constituted by a signal electrode 3 and ground electrodes (20, 21) sandwiching the signal electrode. In addition, a relay line formed on the relay substrate also has a coplanar line structure constituted by a signal line 6 and ground lines (50, 51) sandwiching the signal line. In the present disclosure, the coplanar line structure is not a component required for all of the control electrodes and relay lines, and it is necessary to provide a coplanar line structure in at least a portion electrically connecting the control electrode and the relay line and a portion of the routing portion B connected to the electrical connection portion A of the control electrode.

Lithium niobate and a polymer-based material can be used in known techniques for a material of a substrate having an electro-optical effect. In addition, it is needless to say that a known technique in the related art such as a method of forming an optical waveguide through Ti diffusion and ridge formation or a method of forming a control electrode on a base electrode of, for example gold (Au) or titanium, by gold plating can also be applied to the present disclosure. Further, an insulating material such as alumina can be used for the relay substrate.

A feature of the present disclosure is to make a distance (G2) between ground electrodes of a region in which a pad portion of the signal electrode of the electrical connection portion A is formed and a distance (G1) between ground electrodes of the routing portion B substantially equal to each other. The wording "being substantially equal to" in the present disclosure not only means being equal but also means that a deviation from equality may be allowed in a range in which effects (an effect of reducing a propagation loss) of the present disclosure are exhibited.

In this manner, a distance between the ground electrodes (20, 21) is set to be fixed regardless of a change in the width of the signal electrode 3 to make a high frequency signal flow smoothly, and thus it can be confirmed that a propagation loss can be reduced.

Further, a distance G3 between the ground lines (50, 51) sandwiching the signal line 6 in the electrical connection portion of the relay line is set to be substantially equal to the distance G2 between the ground electrodes (20, 21) sandwiching the signal electrode 3 in the electrical connection portion A of the control electrode, and thus it is possible to further reduce a propagation loss.

In addition, the signal electrode 3 in the electrical connection portion A of the control electrode is electrically connected from the relay line and includes a pad portion having the largest width and a tapered portion (a portion denoted by sign T) which continues from the pad portion to the routing portion B. A length L of the pad portion is set to a quarter or less, and more preferably, a tenth or less of the wavelength of a high frequency signal and thus it is possible to suppress the influence of a change in the width of the signal electrode due to the pad portion on a propagation loss as much as possible. For example, in a case of a high frequency signal of 32 GHz, approximately 0.5 mm may be set as a tenth of a wavelength when an effective dielectric constant of a line is taken into account.

Further, the signal electrode 3 in the electrical connection portion A of the control electrode is electrically connected from the relay line and includes a pad portion having the largest width and a tapered portion which continues from the pad portion to the routing portion B. A width S2 of the pad portion is set to a quarter or less, and more preferably a tenth or less of the wavelength of a high frequency signal, and thus it is possible to suppress the influence of a change in the width of the signal electrode due to the pad portion on a propagation loss as much as possible.

Figure 2:
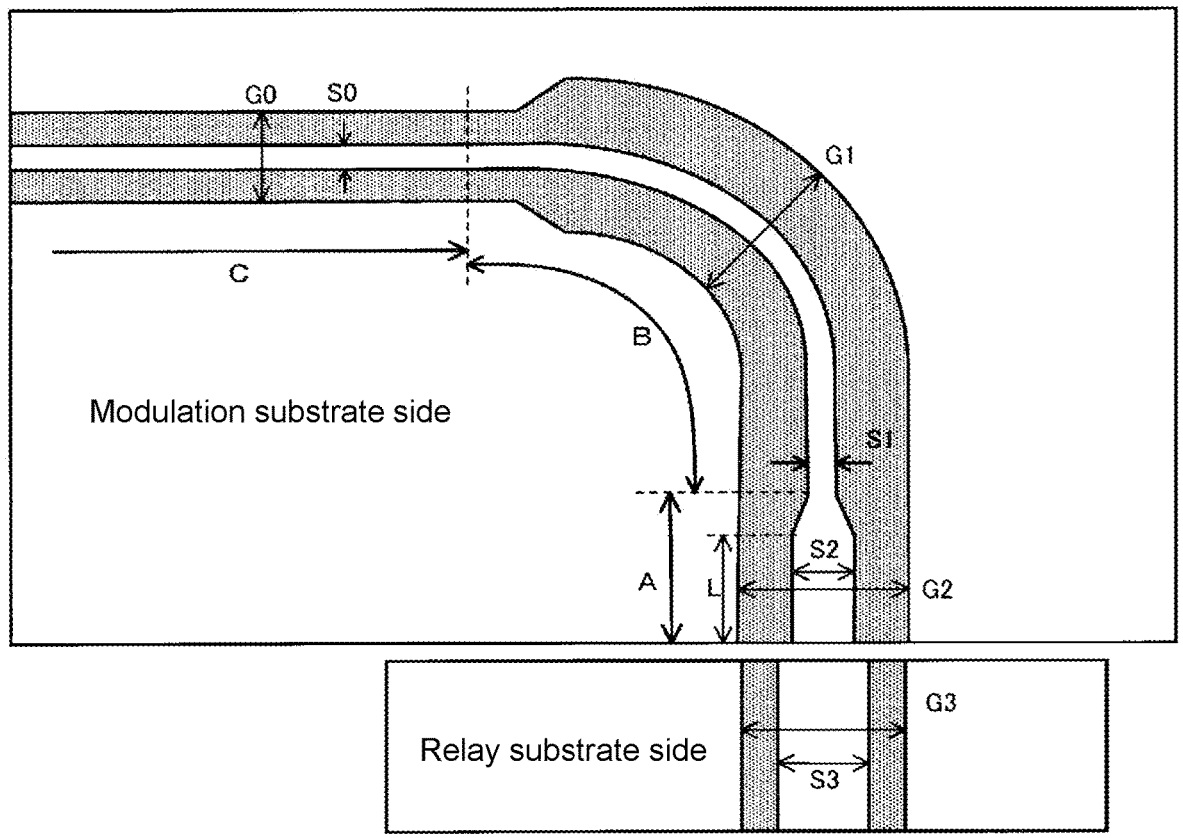
FIG. 2 is a diagram illustrating a second example according to the optical modulator of the present disclosure.

FIG. 2 is a diagram illustrating the electrical connection portion A, provided with a pad portion, and the routing portion B which constitute the control electrode, and an active portion C applying an electrical field to the optical waveguide. The optical modulator of the present disclosure is not limited to that illustrated in FIG. 2, and it is possible to relatively suppress the influence of the electrical connection portion A when the length L of the electrical connection portion A or the pad portion is shorter than the length of a portion in which the distance G1 between the ground electrodes of the routing portion B becomes equal to the distance G2 between the ground electrodes of the electrical connection portion A.

In FIG. 2, the widths (S1, S0) of the signal electrodes in the routing portion B and the active portion C are set to be equal to each other, but are not limited thereto. The width of the signal electrode can also be changed in the middle of the routing portion B. In addition, the distance G1 between the ground electrodes of the routing portion B is changed only once just before being connected to the active portion C, but is not limited thereto. The distance G1 can also be changed a plurality of times in the middle of the routing portion B.

The present disclosure provides an optical modulator that includes a substrate having an electro-optical effect, an optical waveguide formed on the substrate, a control electrode formed on the substrate and applying a high frequency signal in order to modulate light waves propagating through the optical waveguide, and a relay substrate provided with a relay line in order to transfer the high frequency signal to the control electrode, in which the control electrode and the relay line together have a coplanar line structure inclusive of at least electrical connection portions of both the control electrode and the relay line, the control electrode includes an electrical connection portion of the control electrode and a routing portion positioned between the electrical connection portion of the control electrode and an active portion applying an electrical field to the optical waveguide, the routing portion has a coplanar line structure, and a distance G2 between ground electrodes sandwiching a signal electrode in the electrical connection portion of the control electrode is substantially equal to a distance G1 between ground electrodes sandwiching a signal electrode of the routing portion. Therefore, discontinuity of a current path in the electrical connection between the control electrode of the optical modulator and the relay line of the relay substrate is eliminated, and thus it is possible to reduce a propagation loss of the high frequency signal.

As described above, according to the present disclosure, it is possible to provide an optical modulator in which a propagation loss of a high frequency signal in electrical connection between a control electrode of the optical modulator and a relay line of a relay substrate is reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical modulator comprising:
a substrate having an electro-optical effect;
an optical waveguide formed on the substrate;
a control electrode formed on the substrate and applying a high frequency signal in order to modulate light waves propagating through the optical waveguide; and
a relay substrate provided with a relay line in order to transfer the high frequency signal to the control electrode,
wherein the control electrode and the relay line together have a coplanar line structure inclusive of at least electrical connection portions of both the control electrode and the relay line,
the control electrode comprises an electrical connection portion of the control electrode, and a routing portion positioned between the electrical connection portion of the control electrode and an active portion applying an electrical field to the optical waveguide,
the routing portion has a coplanar line structure, and
a distance G2 between ground electrodes sandwiching a signal electrode in the electrical connection portion of the control electrode is substantially equal to a distance G1 between ground electrodes sandwiching a signal electrode of the routing portion.

2. The optical modulator according to claim 1,
wherein a distance G3 between ground lines sandwiching a signal line in the electrical connection portion of the relay line is substantially equal to the distance G2 between the ground electrodes sandwiching the signal electrode in the electrical connection portion of the control electrode.

3. The optical modulator according to claim 2,
wherein the signal electrode in the electrical connection portion of the control electrode is electrically connected from the relay line and comprises a pad portion having a largest width and a tapered portion which continues from the pad portion to the routing portion, and
a length L of the pad portion is set to a tenth or less of a wavelength of the high frequency signal.

4. The optical modulator according to claim 3,
wherein the signal electrode in the electrical connection portion of the control electrode is electrically connected from the relay line and comprises a pad portion having a largest width and a tapered portion which continues from the pad portion to the routing portion, and
a width S2 of the pad portion is set to a tenth or less of the wavelength of the high frequency signal.

5. The optical modulator according to claim 4,
wherein a material of the substrate having an electro-optical effect is lithium niobate or a polymer-based material.

6. The optical modulator according to claim 3,
wherein a material of the substrate having an electro-optical effect is lithium niobate or a polymer-based material.

7. The optical modulator according to claim 2,
wherein the signal electrode in the electrical connection portion of the control electrode is electrically connected from the relay line and comprises a pad portion having a largest width and a tapered portion which continues from the pad portion to the routing portion, and
a width S2 of the pad portion is set to a tenth or less of the wavelength of the high frequency signal.

8. The optical modulator according to claim 7,
wherein a material of the substrate having an electro-optical effect is lithium niobate or a polymer-based material.

9. The optical modulator according to claim 2,
wherein a material of the substrate having an electro-optical effect is lithium niobate or a polymer-based material.

10. The optical modulator according to claim 1,
wherein the signal electrode in the electrical connection portion of the control electrode is electrically connected from the relay line and comprises a pad portion having a largest width and a tapered portion which continues from the pad portion to the routing portion, and
a length L of the pad portion is set to a tenth or less of a wavelength of the high frequency signal.

11. The optical modulator according to claim 10,
wherein the signal electrode in the electrical connection portion of the control electrode is electrically connected from the relay line and comprises a pad portion having a largest width and a tapered portion which continues from the pad portion to the routing portion, and
a width S2 of the pad portion is set to a tenth or less of the wavelength of the high frequency signal.

12. The optical modulator according to claim 11,
wherein a material of the substrate having an electro-optical effect is lithium niobate or a polymer-based material.

13. The optical modulator according to claim 10,
wherein a material of the substrate having an electro-optical effect is lithium niobate or a polymer-based material.

14. The optical modulator according to claim 1,
wherein the signal electrode in the electrical connection portion of the control electrode is electrically connected from the relay line and comprises a pad portion having a largest width and a tapered portion which continues from the pad portion to the routing portion, and a width S2 of the pad portion is set to a tenth or less of the wavelength of the high frequency signal.

15. The optical modulator according to claim 14,
wherein a material of the substrate having an electro-optical effect is lithium niobate or a polymer-based material.

16. The optical modulator according to claim 1,
wherein a material of the substrate having an electro-optical effect is lithium niobate or a polymer-based material.

* * * * *